United States Patent
Sigg et al.

(10) Patent No.: US 6,532,410 B2
(45) Date of Patent: Mar. 11, 2003

(54) METHOD COORDINATING OPERATING BEHAVIOR OF MOTOR VEHICLE DEVICE

(75) Inventors: Peter Sigg, Friedrichshafen (DE); Sven Diebold, Immenstaad (DE); Hugo Schmid, Bodnegg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/801,058

(22) Filed: Mar. 7, 2001

(65) Prior Publication Data

US 2002/0143453 A1 Oct. 3, 2002

(51) Int. Cl.$^7$ ................................................ G06F 7/00
(52) U.S. Cl. ............................................ 701/51; 477/43
(58) Field of Search ......................... 701/51, 56, 55; 477/34, 43

(56) References Cited

FOREIGN PATENT DOCUMENTS

| | | | | |
|---|---|---|---|---|
| DE | 36 24 456 A1 | 1/1988 | ............ | B60R/16/02 |
| DE | 42 09 150 A1 | 9/1992 | ............ | B60K/41/00 |
| DE | 43 02 248 A1 | 7/1993 | ............ | F16H/59/04 |
| DE | 690 02 399 T2 | 12/1993 | ............ | G01C/22/02 |
| DE | 44 00 079 A1 | 7/1995 | ............ | F16H/61/00 |
| DE | 691 13 567 T2 | 3/1996 | ............ | G01M/19/00 |
| DE | 196 25 628 C1 | 6/1997 | ............ | G06F/12/00 |
| DE | 196 19 354 A1 | 11/1997 | ............ | G05B/19/04 |
| DE | 196 25 619 A1 | 1/1998 | ............ | G06F/12/16 |
| DE | 196 25 627 A1 | 1/1998 | ............ | G06F/13/16 |
| DE | 197 05 507 C1 | 6/1998 | ............ | G05B/15/02 |
| DE | 197 40 525 C1 | 2/1999 | ............ | G06F/19/00 |
| DE | 198 46 070 A1 | 4/1999 | ............ | G60R/16/02 |
| DE | 198 36 748 C1 | 4/2000 | ............ | B60R/16/02 |
| EP | 0 697 080 B1 | 3/1997 | ............ | F16H/61/00 |

Primary Examiner—Yonel Beaulieu
(74) Attorney, Agent, or Firm—David & Bujold, P.L.L.C.

(57) ABSTRACT

A method for application of the operating behavior of a device for actuating in particular a transmission. Actuators of this device defined by data elements and stored in a constant memory value are controlled by an electronic control unit. It is proposed to optimize the operating behavior of the transmission resulting here as consequence of predefined initial data elements of the correcting parameters by associating, as needed, new data elements with individual correcting parameters. The basic structure of the initial data elements is here copied, then the new data elements are as needed written in the copy of the basic structure of the initial data elements and at the same time corresponding address reference is entered in the data section of the initial data elements which points to the new data elements.

11 Claims, 2 Drawing Sheets

METHOD COORDINATING OPERATING BEHAVIOR OF MOTOR VEHICLE DEVICE

FIELD OF THE INVENTION

The invention concerns a method for coordinating the operating behavior of a device for actuating a component of a motor vehicle, particularly a transmission:

BACKGROUND OF THE INVENTION

Not only motor vehicle transmissions but also other components of a motor vehicle, such as clutches or valves, are increasingly being electronically controlled. To make an actuating device for such a motor vehicle component ready for production requires a testing phase in which multiple correcting parameters have to be coordinated. The expression "correcting parameter" stands for all variables that can be represented by single variables, characteristic lines, characteristic fields, tables and the like, which establish the operating characteristic of the actuating device. In automatic or automated transmissions, for example, whether the shifting characteristic is sporting or comfortable can be established by correcting parameters. The correcting parameters often have different values depending on the concrete driving situation.

In order that the actuating device provides a desired operating characteristic, an optimization is required-in the testing phase. For correcting parameters, adequate values must be found which provide the desired operating characteristic. This can be obtained, at least partly, within the scope of a simulation, but trials are likewise carried out to see how the actuating device conducts itself, to see how the actuating device actually behaves. This is especially the case in the final phase of development and testing of a new actuating device. It is important to carry out the tests on a vehicle which, in principle, already equals the production vehicles to be delivered to customers.

Only thus can it be ensured that no surprisingly irregular behavior appears in the production vehicles. For this reason, a vehicle is made available to the tester in which the actuating device to be tested is installed exactly as in the later production vehicles.

In modern vehicle manufacture, the structural combining of the vehicle electronic system with the controlled mechanical components is required more and more. Let the mechatronics be mentioned here only as a catchword.

It is thus known from the practice, e.g. in electronically controlled transmissions, to situate the control electronic system completely in the oil sump of the transmission. An arrangement of a transmission control unit in the oil sump has also been described in EP 0 697 080.

In such a transmission, the tester has no free access to the control electronic system to allow attachment of an emulation module by means of which the processor of the electronic control system could emulate the correcting parameter with different sets of parameter values. However, even in electronic control systems thus inaccessibly arranged, it is sought to give the tester the possibility of carrying out modifications of the correcting parameter "on board", i.e. on the vehicle, in order that immediately thereafter he can set and can test the effects of his modifications.

The invention, therefore, is based on the problem of providing a method of the kind designated above which allows a coordination of the correcting parameters even when the control electronic system of the actuating device is installed in the motor vehicle so that there is no open access to it.

SUMMARY OF THE INVENTION

In solving this problem, the invention departs from a method for coordinating the operating behavior of a device for actuating a motor vehicle, especially a transmission, wherein the device comprises actuators for the motor vehicle components, the same as an electronic control unit which controls the actuators according to predetermined correcting parameters represented by data elements wherein in the method, an initial data element is first assigned to each correcting parameters. Then the operating behavior of the actuating device is tested with the initial data elements of the correcting parameters and on the strength of that, depending on the test results, new data elements are assigned at least to a part of the correcting parameters.

According to the invention, it is provided that each initial data element be stored in a programmable memory for constant values of the control unit and, with each stored initial data element, an additional blank address memory section in the memory for constant values be associated, that for each new data element, an addressable new data memory section and an appertaining address memory section is made available in which the new data element is stored, that the memory address of each new data element be written in the address memory section of the appertaining initial or reference data element, and that the control unit at each access tests on a correcting parameter, whether in the address memory section associated with the data element of this correcting parameter a memory address has been written and in the affirmative accesses the new data memory section addressed by the memory address, otherwise accesses the initial or reference data element of the correcting parameter.

The invention is based on the fact that the storing structure of the data elements is predetermined in a memory for constant values and cannot be changed by writing cycles. Therefore, the invention proposes to copy the storing structure of the original data elements and to write new data elements in the copy of the storing structure. In the original data section is written, at the same time a corresponding address reference which points to the copied storing structure with the new data elements.

An essential advantage of the inventive method is that it can be recursively applied. The whole process, i.e. the copy of the storing structure of the old data memory section plus a new deposit of the copied storing structure with new data elements with address reference from the old data memory section, can be consecutively repeated until the available blank data memory section is absolutely used up.

The expression data element stands here for the representation of a correcting parameter according to data technology. It is obvious that the variable of a data element and the inner data organization thereof can vary to a great extent, depending on whether the data element represents an individual value or whether it represents complex structures, such as a table or a characteristic field. It is absolutely possible that one data element be organized as data field consisting of a multiplicity of data words, but a data element can also consist only of a single data word.

When speaking of an initial data element, thereby it is understood aa a data element whose contents serve as point of departure for the subsequent coordination. The data contents of an initial data element can be arbitrarily established by the test person, e.g. according to experimental values. It can also form the result of a previous coordination procedure within the scope of which a rough coordination of the correcting parameters was obtained.

In the inventive solution, the initial data elements are written in a programmable constant memory value of the control unit. In the current electronic control systems, a constant memory value is regularly already available, namely, in the form of a program memory for a microprocessor program. The program memory can be dimensioned so as to offer sufficient memory space at least for the initial data elements beyond the control program. In this manner, it is possible (at least for the initial data elements) to eliminate an additional memory module, but it is obvious that the initial data elements can be written also in a separate memory module.

Today In microelectronic control circuits, constant value memories electrically erasable EEPROMS or flash EEPROMS are customarily used. Even though, in such constant value memories, it is basically possible to change the memory contents by erasing and a subsequent new entry, those superscribing processes often cannot be carried out without limit and frequently not within a sufficiently short time. For this reason, according to the invention, when a correcting parameter has to be updated, there is no writing over its initial data element which is left in the constant memory value. The new data element of the correcting parameter concerned is stored in a different place. It would now be impracticable to change the control program of the control unit in the sense that when the correcting parameter concerned is called, it immediately accesses the new data element. Instead of this, the control program is left unchanged, where in the future, when the correcting parameter is called, it first branches to the memory address of the initial data element. To communicate to the control program that the initial data element of a correcting parameter no longer applies, the invention refers back to the expedient of the address reference. The address reference is written in the address memory section of the relevant initial data element. At the start of the coordination procedure, the address memory section, associated with each initial data element, is blank. The blank state is conveniently the state of the memory cells of the constant memory value after an erasing operation. If a new data element is assigned to a correcting parameter, the memory address in which the new data element has been stored is written in the address memory section of the appertaining initial: data element.

Each time a correcting parameter is called, the control program first examines the address memory section associated with the initial data element of the correcting parameter. If the address memory section is blank, this tells the control program that for the correcting parameter concerned the initial data element still applies. Accordingly, it reads the initial data element and uses it in its future operations. On the contrary, if the address memory section contains an address reference (pointer), the control program knows that to the correcting parameter concerned a new data element has been assigned and that the new data element is to be found in the new data memory section identified by the pointer.

In the invention, additional memory space beyond the initial data elements is only needed forthose correcting parameters to which new data elements have been assigned. In the practice, it has been found that the additional memory space needed can often be covered by a reserved memory which is usually held in the memory modules of current electronic control systems. Thus It is not unusual that in EEPROMS or flash EEPROMS, which serve as program memory, a reserve of blank memory space is available to use for other purposes which occasionally extends to the magnitude range of the memory space required for the program itself.

One development of the invention provides that each new data element be stored in a blank new data memory section of the constant memory value.

It is also alternatively conceivable, however, that each new data element be stored in a new data memory section of a read-write memory of the control unit. This read-write memory can be a RAM memory which simultaneously serves as data memory for the variables appearing when working off a microprocessor program. But it is also possible to provide an additional RAM module in which the new data elements are exclusively stored.

The inventive method is not only adequate but, in particular, when the control unit is installed in the vehicle inaccessibly concealed and communication by data technology is only possible from outside with the components of the control unit by guided out data communication lines. In this case, it is easily possible for a test person or an applicator (i.e. a person who applies new data elements for the correcting parameters) to coordinate the correcting parameters while sitting in the vehicle, e.g. by means of an application unit, which is carried in the passenger compartment of the vehicle and can be attached to the guided out communitation lines of the control unit. The application thus can directly examine on the vehicle how the application of a new set of data elements works in the practice.

Until the desired operating behavior of the actuating device appears, it will not be necessary to apply new data elements for individual correcting parameters, therefore the operating behavior of the actuating device is repeatedly examined and after each examination, depending on the current examination result, at least one part of the correcting parameters is updated, as may be needed, by assignment of a currently new data element.

As long as a constant memory value with enough storage capacity is available, upon each updating of a correcting parameter its current new data element can be stored in a blank new data memory section of the constant memory value, an additional blank address memory section in the constant memory value is further associated with the new data element. The memory address of the new data element is written in the address memory section of the last applicable data element of the correcting parameter prior to the updating.

In this development, an interlinked recursive access to the actually valid. data element of a correcting parameter results. The interlinkage is ensured by the address memory section which is associated with every new data element. In each data element—be it the initial data element or a subsequently applied data element—the control unit (or the control program) tests whether the address memory section associated with the current data element is blank or contains a pointer. In the first case, the control unit knows that the interlinkage is at the end and accesses the concerned data element. In the latter case, the control unit knows that there is at least one further, subsequently applied data element for the correcting parameter concerned and branches to the next data element identified by the pointer. Here again an examination of the appertaining address memory section first takes place. By interlinkage by means of pointers the applicator is enabled subsequently to program, in new data elements the constant memory value without having to carry out erasures in the constant memory value. For reasons of security, the subsequent programming is conveniently carried out while the vehicle is stationary.

In the course of the coordination procedure for individual correcting parameters, if a plurality of new data elements has to be subsequently programmed, it can occur that the available memory space in the constant memory value be some time or other used up. In the case of an erasable, especially electrically erasable, constant memory value can be established by correcting parameters, a complete updating of the memory contents can then be carried out wherein the last valid data elements of the correcting parameters, i.e. the data elements standing at the end of the recursion, are conveniently programmed in as new initial data elements. The applicator can advantageously carry this out by means of an application unit carried along in the vehicle. It has been found in the practice that in the usual procedure requirement of an update is to be taken into account once a day.

If the new data elements have been written in a read-write memory, it is not necessary to associate with the new data elements also address memory sections for pointers, since it is possible in read-write memories to write upon as often as desired and quickly enough. It is then advisable that upon each updating of a correcting parameter, the currently new data element is written upon the last data element valid prior to the updating, provided it is stored in the read-write memory. Thus only the memory space must be held ready in the read-write memory for each correcting parameter would be necessary for a single data element of the correcting parameter concerned. This results in a very small space being altogether required.

At any time, in order to have a general view as to how much memory space is still available for new data elements, it is advisable that a pointer in the control unit, be maintained which points to the beginning of a blank reserved memory still available for registering new data elements in the constant memory value or the read-write memory and that upon each new data element registered in the reserved memory the pointer is updated accordingly. When a new data element is written in the reserve memory and accordingly the reserved memory becomes smaller, this pointer corresponds to the memory address of the new data element and can be thus written as address reference in the address memory section of the previous data element in the recursion.

A preferred if not even exclusive sphere of utilization of the inventive method is the electronic control of a motor vehicle transmission wherein the electric and electronic components of the control unit are collected in an electronic assembly, as a rule tightly packed, and the electronic assembly is at least partly immersed in the oil sump of the transmission. The electronic assembly can especially be designed in hybrid construction, for example, with a ceramic base plate upon which the different components are mounted by hybrid technology.

Controlled by the control unit, the actuators for the motor vehicle components can be of different kinds depending on the configuration of the motor vehicle components. They can comprise electromotors, hydraulic actuators, valves, pumps, or the like.

BRIEF DESCRIPTION OF THE DRAWINGS

Other advantages and designs of the invention result with reference to the enclosed drawings in which.

DETAILED DESCRIPTION OF THE INVENTION

Figure 1:
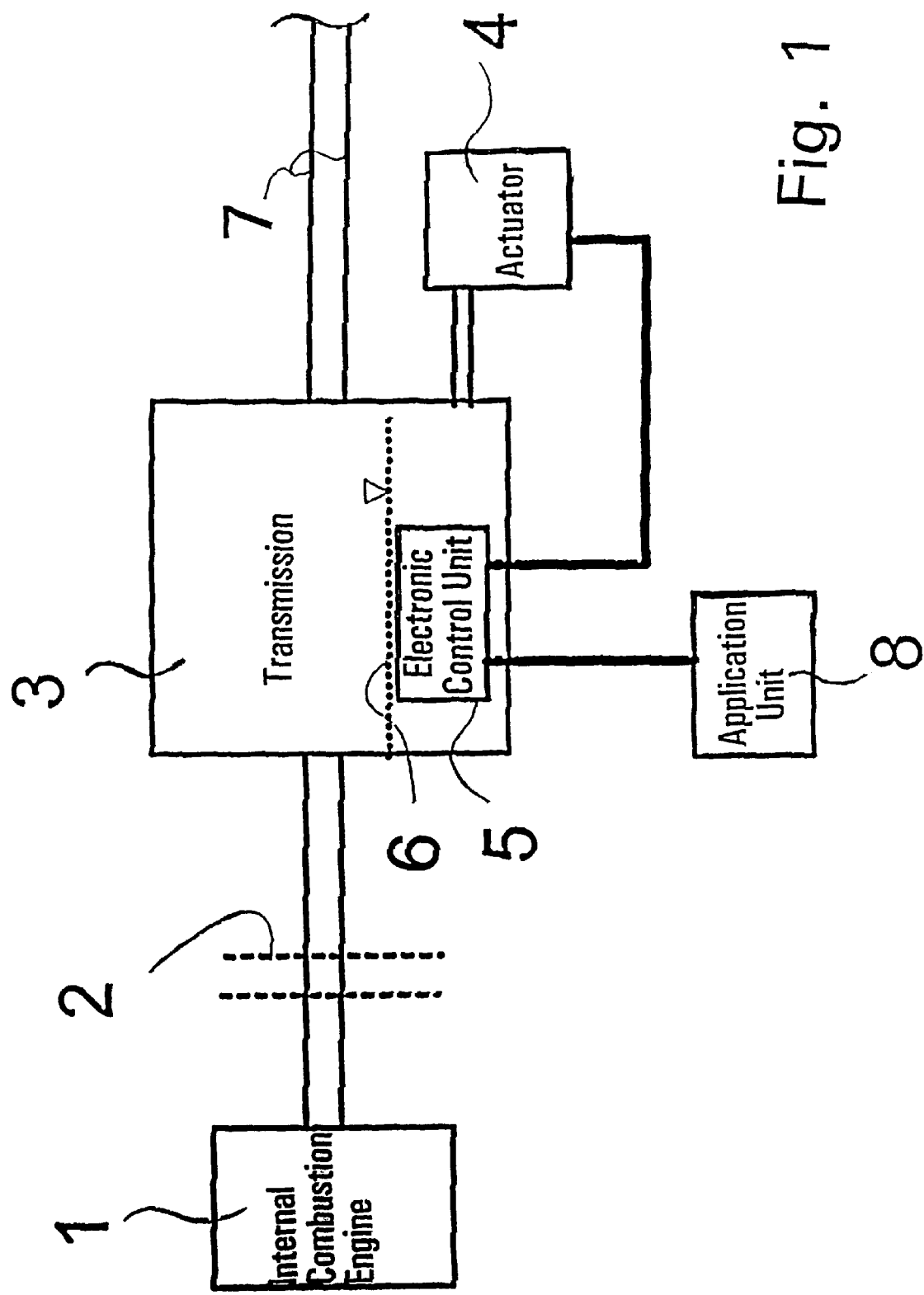
FIG. 1 is a diagram of a power train of a motor vehicle with an application unit attached to an electronic transmission control unit.

In FIG. 1 an internal combustion engine 1 is connected with an electronically controlled transmission 3 (optionally, via a clutch 12 such as a friction clutch) which can be, e.g. an automatic powershift transmission or a continuously variable transmission. Transmission 3 is operatively connected with driven wheels of the vehicle (not shown in detail). A regulating system having at least one actuator 4, which can be an electromotor or a hydraulic actuator serves to actuate the transmission 3. It is obvious that the regulating system can comprise a number of optionally different actuators. The actuator 4 is controlled by an electronic control unit 5 which, with the transmission 3, is packed together to form a mechatronic structural unit and is situated within the transmission 3 in an oil sump, indicated by a dotted line 6.

In a conventional manner (not shown in detail), the control unit 5 has a microprocessor, a program memory, a RAM memory and input and output units. The program memory is formed by a constant memory value, such as an EEPROM or flash EEPROM. From the transmission 3 are spread out data communication lines 6 through which the components of the control unit 5 are accessible by data technology and through which can be modified, in particular, the correcting parameters which modulate the adjusting characteristic of the adjusting operations controlled by the control unit 5.

The correcting parameters can have a constant value which is the same fore all driving and operating situations, but they can also depend on different operating variables of the vehicle, such as the vehicle speed. In this case, they can be shown in the form of tables, characteristic lines, or characteristic fields. Regardless of whether the value of a correcting parameter, to be used for a control operation in the control unit 5, is formed by a constant or must be read out from a characteristic field or a table, in the data technology each correcting parameter is formed by a more or less large data element. To modify individual correcting parameters, the data contents of the data elements concerned have to be then changed or new data elements with changed data contents assigned to the correcting parameters. Such data modification can be carried out by means of an application unit 8 which, via the data communication lines 7, can register data in the control unit 5 or read out therefrom.

Figure 2:
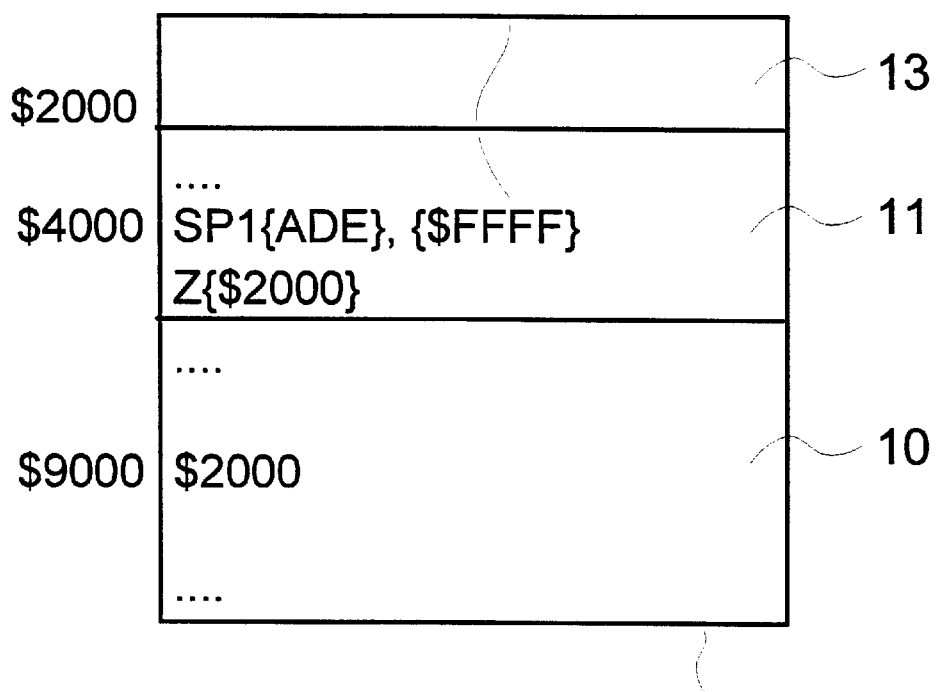
FIG. 2 is a diagrammatic contents of a program memory of the transmission control unit prior to application of a new data element.
Figure 3:
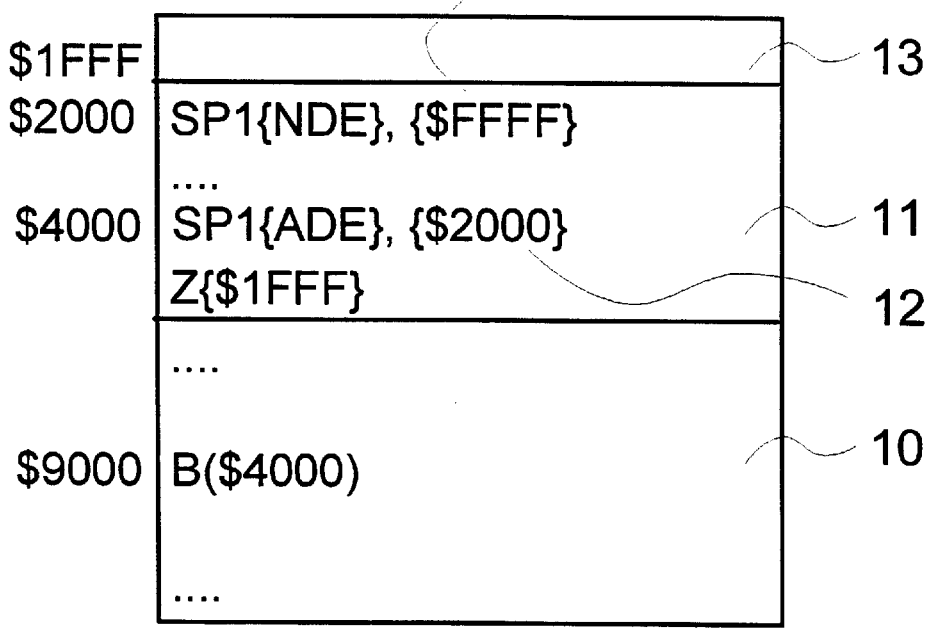
FIG. 3 is the contents of the program memory after the data application.

Reference is now made to FIGS. 2 and 3. The program memory of the control unit 5 is designated with 9. It has a memory section 10 in which the control program for the microprocessor of the control unit 5 can be stored. The control program requires only one part of the whole memory space offered by the program is available in the program memory 9. The part of program memory 9 occupied with data elements is designated with 11.

For each correcting parameter, an initial data element is first written in the program memory 9. The part of the program memory 9 occupied with data elements is designated with 11. For each correcting parameter, an initial data element is first written in the program memory 9. Besides, with each initial data element one address memory field 12 is associated which conveniently is physically adjacent to the relevant initial data element in the memory 9. When observing FIG. 2, an initial data element ADE for a correcting parameter SP1 is stored at the memory address 4000 (all memory addresses are given in hexadecimal notation). Graphically, in the program part 10 of the program memory 9 a command B, which directs a jump to the-memory address 4000, i.e. to the place where the data element SP1 (ADE), appears on the memory address 9000 in order to show access to the data element by the control program. The control program does not immediately take the data element SP1 (ADE) for its further operations but first reads the contents of the address memory field 12 associated with the data element SP1 (ADE). In FIG. 2, the memory field 12 is blank, which is to be detected on the field contents ($FFFF) (it is assumed that the erased state of the memory cells of the program memory 9 corresponds to a logical one).

When a changed data element is to be applied to the correcting parameter SP1, because it has been found that the initial data element did not lead to the desired operating behavior of the transmission control, the changed new data element can be written in a reserved blank memory 13 which still is freely available beyond the already described memory sections 10 and 11 of the program memory 9.

In FIG. 2, as an example, the reserve memory 13 begins at the memory address 2000. By means of the application unit 8 (see FIG. 1), the new data element is programmed in the memory address 2000 in the program memory 9. FIG. 3 shows this state. The new data element designated with NDE for the correcting parameter SP1 is to be detected at the memory address 2000. Together with the entry of the new data element SP1 (NDE), the memory address of the new data element SP1 (NDE) is written in the address memory field 13 of the old data element SP1 (ADE). In this manner a recursion in the course of which the control program is defined, when working off the command B ($4000) on the memory address 4000 by the contents of the address field 13 stored therein, is referred to the memory address 2000. It is thus ensured that the old data element SP1 (ADE) remains without being taken into account but without it being needed to modify the appertaining command in the program part 10 of the program memory 9.

The above interlinkage can be continued if the data element SP1 (NDE) also proves inadequate and another data coordination is required or the correcting parameter SP1. To this end, to the data element SP1 (NDE)—and generally to every data element—is also assigned an address memory field 12 which is blank at first. Therein an address reference can be entered which, in case of a repeated application of a data element for the correcting parameter SP1, points to the memory address of the data element. In this manner, it is possible to continue until the reserved memory 13 of the program memory 9 has been used up.

In part 11 of the program memory 9, a pointer Z is further guided which points to the beginning of the reserved memory 13 and is updated after each application of a new data element. With the aid of the pointer Z, the control program can establish whether and where there still is space available in the program memory 9 to store new data elements to be applied. In the example of FIGS. 2 and 3, the contents of the pointer Z is detected, which in FIG. 2 is $2000, in FIG. 3 is reduced to $1FFF as consequence of the addition of the data element SP1 (NDE). The reserved memory 13 now begins in FIG. 3 at this memory address 1FFF.

In this method, it is advantageous that no additional memory module is needed for the data application. When the. program memory 9 is full, an update of the program memory 9 is carried out in which the last valid data elements of the correcting parameters are stored as new initial data elements but other previously applied data elements are erased so that there again is enough memory space for an eventual continuation of the coordination procedure in the program memory 9. The coordination procedure especially can be conducted in an installation condition of the transmission of the correcting system and of the control unit, such as to be found in the subsequent production vehicles. This means in reverse conclusion that in production vehicles a subsequent application is also possible, if needed.

Even if the initial data elements of the correcting parameters have been written in the program memory 9, the above also applies when new applied data elements are written in the RAM memory of the control unit 15 in which sufficient reserved memory is also usually available. In this case, it is possible for the new data elements written in the RAM memory to omit even an additional address memory field since it is always possible, in the RAM memory, to write over data elements. But to the initial data elements listed in the program memory 9, an address memory field 12 is also obviously assigned. The memory address is then entered on which the new data elements for the correcting parameter concerned have been written in the RAM memory.

It is conceivable that the applicator occasionally desires, after applying new data elements, to carry out a comparison test with the initial data. The applicator, therefore, preferably has the possibility of blocking the recursion so that, independently of the contents of the address memory fields 12 associated with the initial data elements, the control program always reads out the initial data elements and use them for its control operations. The applicator can effect this blockage, for example, by setting a corresponding control bit. By resetting the control bit, it can again lift the blockage of the recursion.

REFERENCE NUMERALS 1 internal combustion engine
2 clutch
3 transmission, motor vehicle components
4 actuator
5 electronic control unit
6 oil sump
7 data communication line
8 application unit
9 program memory
10 memory section
11 part of the program memory occupied with data elements
12 address memory field
13 free reserved memory
ADE initial data element
B command
NDE new data element
SP1 correcting parameter
Z pointer

What is claimed is:

1. A method of coordinating an operating behavior of a device for actuating a motor vehicle component (3), of a transmission, wherein the device has actuators (4) for motor vehicle components (3) and an electronic control-unit (5) which controls the actuators (4) according to predetermined correcting parameters (SP1) represented by data elements (ADE, NDE), the method comprising the steps of
   a) first assigning to each correcting parameter (SP1) an initial data element (ADE);
   b) examining the operating behavior of the device with the initial data elements (ADE) of the correcting parameters (SP1);
   c) assigning, depending on test results, a new data element (NDE) to at least part of the correcting parameters (SP1);
   d) storing each initial data element (ADE) in a programmable constant value memory (9) of the control unit (5);
   e) assigning an additional blank address memory section (12) in the constant value memory (9) to each stored initial data element (ADE);

f) making an addressable new data memory section available for each new data element (NDE) in which the new data element (NDE) is stored;

g) writing the memory address of each new data element (NDE) in the address memory section (12) of the appertaining initial data element (ADE); and h) testing the control unit (5), upon each access to a correcting parameter (SP1), as to whether a memory address is written in the address memory section (12) associated with the initial data element (ADE) of this correcting parameter (SP1) and, in the affirmative, accesses the new data memory section addressed by the memory address, and otherwise, accesses the initial data element (ADE) of the correcting parameter (SP1).

2. The method according to claim 1, further comprising the step of storing each new data element (NDE) in a blank new data memory section of the constant value memory (9).

3. The method according to claim 1, further comprising the step of storing each new data element (NDE) in a new data memory section of a read-write memory of the control unit (5).

4. The method according to claim 1, further comprising the step of repeatedly examining the operating behavior of the device so that after each examination, depending on a current examination result, at least one part of the correcting parameter (SP1) is updated by assigning a current new data element (NDE).

5. The method according to claim 2, further comprising the steps of storing upon each updating of a correcting parameter (SP1) current new data element (NDE) in a blank new data memory section of the constant value memory (9), further associating in the constant value memory (9) with the new data element (NDE) an additional blank address memory section (12), and writing in the address memory section (12) of the last data element (ADE) of the correcting parameter (SP1) that was valid prior to the updating that the memory address of the new data element (NDE).

6. The method according to claim 3, further comprising the step of writing, at each updating of a correcting parameter (SP1), a last data element that was valid prior to the updating, as long as the last data element was been stored in the read-write memory, the current new data element.

7. The method according to claim 2, further comprising the step of maintaining a pointer (Z) in the control unit which points to the beginning of a blank reserved memory (13) still available in the constant value memory (9) for entering new data elements (NDE) and updating the pointer (Z) upon each entry of a new data element (NDE) in the memory reserve (13).

8. The method according to claim 2, further comprising the step of maintaining a pointer (Z) in a control unit which points to the beginning of a blank reserved memory (13) still available in the read-write memory for entering new data elements (NDE) and updating the pointer (Z) upon each entry of a new data element (NDE) in the memory reserve (13).

9. The method according to claims 1, further comprising the step of forming the control unit (5) of a microprocessor whose control program is stored at least in part in the constant value memory (9).

10. The method according to claim 1, further comprising the step of designing the constant value memory as EEPROM.

11. The method according to claim 1, further comprising the step of designing the constant value memory as flash EEPROM.

* * * * *